United States Patent
Curry et al.

(10) Patent No.: US 10,393,899 B2
(45) Date of Patent: Aug. 27, 2019

(54) AUTOMATIC TRACKING OF FAULTS BY SLOPE DECOMPOSITION

(71) Applicants: William Curry, Houston, TX (US);
Ethan Nowak, McKinney, TX (US);
Fuxian Song, Houston, TX (US)

(72) Inventors: William Curry, Houston, TX (US);
Ethan Nowak, McKinney, TX (US);
Fuxian Song, Houston, TX (US)

(73) Assignee: ExxonMobil Upstream Research Company, Spring, TX (US)

(*) Notice: Subject to any disclaimer, the term of this patent is extended or adjusted under 35 U.S.C. 154(b) by 654 days.

(21) Appl. No.: 14/486,881

(22) Filed: Sep. 15, 2014

(65) Prior Publication Data
US 2015/0117151 A1  Apr. 30, 2015

Related U.S. Application Data

(60) Provisional application No. 61/898,253, filed on Oct. 31, 2013.

(51) Int. Cl.
*G03B 42/06* (2006.01)
*G01V 1/30* (2006.01)

(52) U.S. Cl.
CPC ............ *G01V 1/30* (2013.01); *G01V 1/301* (2013.01); *G01V 2210/60* (2013.01)

(58) Field of Classification Search
USPC ............................................. 367/7
See application file for complete search history.

(56) References Cited

U.S. PATENT DOCUMENTS 5,153,858 A * 10/1992 Hildebrand ............ G01V 1/301
   367/72
5,251,184 A * 10/1993 Hildebrand ............ G01V 1/301
   367/72

(Continued)

FOREIGN PATENT DOCUMENTS

| WO | WO 2009/082545 | 7/2009 | |
|----|----------------|--------|---|
| WO | WO 2011/139411 | 11/2011 | |
| WO | WO 2011139411 A1 * | 11/2011 | ............ G01V 1/364 |

OTHER PUBLICATIONS

James G Berryman. Revised and Expanded Oct. 1991. Lecture Notes on Nonlinear Inversion and Tomography. Borehole Seismic Tomography. University of California. Originally Presented at Earth Resources Laboratory MIT. Jul. 9-30, 1990.*

(Continued)

*Primary Examiner* — Isam A Alsomiri
*Assistant Examiner* — Jonathan D Armstrong
(74) *Attorney, Agent, or Firm* — ExxonMobil Upstream Research Company-Law Department

(57) ABSTRACT

Method for locating fault lines or surfaces in 2-D or 3-D seismic data based on the fact that fault discontinuities in the space domain span a wide range in a local slowness (slope) domain, whereas other dipping events in the space domain data, such as noise, tend to be coherent, and hence will appear focused in the slowness dimension. Therefore, the method comprises decomposing the seismic data (102) by a transformation to the local slowness domain, preferably using Gaussian slowness period packets as the local slowness or slope decomposition technique, thereby avoiding problems with the data stationary assumption. In the local slowness domain, faults may be identified (104) using the principle mentioned above, i.e. that faults are represented as (Continued)

a truncation in the space domain data, hence they will appear broadband in the slowness dimension.

12 Claims, 12 Drawing Sheets

(56) References Cited

U.S. PATENT DOCUMENTS

| | | | | |
|---|---|---|---|---|
| 5,475,589 | A * | 12/1995 | Armitage | G01V 1/30 367/38 |
| 5,625,138 | A * | 4/1997 | Elkins | G01V 1/008 324/324 |
| 5,940,778 | A | 8/1999 | Marfurt et al. | |
| 5,999,885 | A * | 12/1999 | Van Bemmel | G01V 1/301 324/323 |
| 6,018,498 | A | 1/2000 | Neff et al. | |
| 6,735,630 | B1 * | 5/2004 | Gelvin | B60R 25/1004 706/33 |
| 6,826,607 | B1 * | 11/2004 | Gelvin | B60R 25/1004 709/224 |
| 6,832,251 | B1 * | 12/2004 | Gelvin | B60R 25/1004 709/224 |
| 6,859,831 | B1 * | 2/2005 | Gelvin | B60R 25/1004 709/224 |
| 7,617,053 | B2 | 11/2009 | Pinnegar et al. | |
| 7,702,463 | B2 * | 4/2010 | Levin | G01V 1/34 367/68 |
| 8,185,316 | B2 * | 5/2012 | Alam | G01V 1/36 702/14 |
| 8,370,122 | B2 * | 2/2013 | Walker | G01V 99/00 703/10 |
| 9,239,398 | B2 * | 1/2016 | Kim | G01V 1/301 |
| 2002/0035443 | A1 | 3/2002 | Matteucci et al. | |
| 2004/0062145 | A1 * | 4/2004 | Dunn | G01V 1/288 367/72 |
| 2006/0122780 | A1 | 6/2006 | Cohen et al. | |
| 2007/0078604 | A1 * | 4/2007 | Kim | G01V 1/301 702/16 |
| 2008/0154505 | A1 * | 6/2008 | Kim | G01V 1/30 702/2 |
| 2008/0285384 | A1 * | 11/2008 | James | G01V 1/345 367/72 |
| 2009/0003132 | A1 * | 1/2009 | Vassallo | G01V 1/3808 367/75 |
| 2009/0292475 | A1 * | 11/2009 | Alam | G01V 1/34 702/14 |
| 2010/0149917 | A1 * | 6/2010 | Imhof | G01V 1/302 367/53 |
| 2010/0274543 | A1 * | 10/2010 | Walker | G01V 99/00 703/6 |
| 2013/0021873 | A1 | 1/2013 | Mattocks et al. | |
| 2013/0121111 | A1 * | 5/2013 | Kim | G01V 1/301 367/73 |
| 2014/0278311 | A1 * | 9/2014 | Dimitrov | G01V 1/282 703/6 |
| 2014/0358445 | A1 * | 12/2014 | Imhof | G01V 1/362 702/14 |

OTHER PUBLICATIONS

Lees, Jack A. "Constructing faults from seed picks by voxel tracking." The Leading Edge 18.3 (1999): 338-340. (Year: 1999).*
Bishop, T. et al. (1985), "Tomographic determination of velocity and depth in laterally varying media," *Geophysics* 50(6), pp. 903-923.
Admasu, F. et al. (2006), "Autotracking of faults on 3D seismic data," *Geophysics* 71(6), pp. A49-A53.
International Search Report, PCT/US2014/055682, dated Mar. 6, 2015.
Candes, E. et al. (2006), "Fast Discrete Curvelet Transforms," *Multiscale Model. Simul.* 5(3), pp. 861-899.
Canales, L.L. (1984), "Seismic Processing," *SEG Expanded Abstracts 3*, pp. 525-527.
Clapp, R.G. (2004), "Incorporating geologic information into reflection tomography," *Geophysics* 69(2), pp. 533-546.
Claerbout, J. (2004), "Earth Soundings Analysis: Processing versus Inversion," Blackwell, p. 91.
Crawley, S. et al. (1999), "Interpolation with smoothly nonstationary prediction-error filters," *SEG Expanded Abstracts 18*, pp. 1154-1157.
Daugman, J.G. (1988), "Complete Discrete 2-D Transforms by Neural Networks for Image Analysis and Compression," *IEE Transactions on Acoustics, Speech, and Signal Processing* 36(7), pp. 1169-1179.
Demanet, L. et al. (2007), "Wave atoms and sparsity of oscillatory patterns," *Appl. Comput. Harmon. Anal.* 23, pp. 368-387.
Fomel, S. (2002), "Applications of plane-wave destruction filters," *Geophysics* 67(6), pp. 1946-1960.
Guitton, A. (2005), "Multiple attenuation in complex geology with a pattern-based approach," *Geophysics* 70(4), pp. V97-V107.
Hale, D. (2006), "Fast local cross-correlations of images," *SEG Expanded Abstracts 26*, pp. 3160-3164.
Kass, M. et al. (1988), "Snakes: Active Contour Models," *International Journal of Computer Vision*, pp. 321-331.
Malik, J. et al. (2001), "Contour and Texture Analysis for Image Segmentation," *Internatrional Journal of Computer Vision* 43(1), pp. 7-27.
Montagnat, J. et al. (2001), "A review of deformable surfaces: topology, geometry and deformation," *Image and Vision Computing* 19, pp. 1023-1040.
Pinnegar, C.R. et al. (2003), "The S-transform with windows of arbitrary and varying shape," *Geophysics* 68(1), pp. 381-385.
Spitz, S. (1991), "Seismic trace interpolation in the F-X domain," *Geophysics* 56(6), pp. 785-794.
Stockwell, R.G. et al. (1996), "Localization of the Complex Spectrum: The S Transform," *IEEE Transactions on Signal Processing*, pp. 998-1001.
Theune, U. et al. (2006), "Least-squares local Radon transforms for dip-dependent GPR image decomposition," *Journal of Applied Geophysics* 59, pp. 224-235.
Xu, C. et al. (1998), "Snakes, Shapes and Gradient Vector Flow," *IEE Transactions on Image Processing* 7(3), pp. 359-369.

* cited by examiner

AUTOMATIC TRACKING OF FAULTS BY SLOPE DECOMPOSITION

CROSS REFERENCE TO RELATED APPLICATIONS

This application claims the benefit of U.S. Provisional Patent Application No. 61/898,253, filed Oct. 31, 2013, entitled AUTOMATIC TRACKING OF FAULTS BY SLOPE DECOMPOSITION, the entirety of which is incorporated by reference herein.

This application is related to U.S. application Ser. No. 13/639,802, published as US 2013/0044568, entitled Seismic Signal Processing with Gaussian Slowness-Period Packets, which is hereby incorporated by reference in its entirety.

FIELD OF THE INVENTION

This disclosure relates generally to the field of geophysical prospecting for hydrocarbons and, more particularly to seismic data processing. Specifically, the disclosure concerns a computer-automated method for tracking faults in seismic data.

BACKGROUND OF THE INVENTION

Many seismic signal processing techniques are applied to seismic data to enhance a migrated image, including regularization to create unrecorded traces needed by many processing algorithms, coherent noise attenuation to remove energy that does not contribute to the image, and random noise attenuation to enhance coherent events both before and after imaging. Often the underlying assumptions behind many of these signal processing techniques include an assumption of stationarity: that the events are planar in nature and that their dip or frequency content does not change with position. In reality, seismic data are non-stationary; they contain events with curvature and the frequency content changes as the recording time increases. This problem is well known, and several methods to address non-stationary data do exist. These include: breaking up the problem into overlapping spatial-temporal windows that are assumed to be locally stationary followed by processing and reassembly; the use of non-stationary filters that vary with space and time; and methods like the curvelet transform that expand the data into a compressible overrepresentation. This disclosure presents an alternative to these methods, an alternative that allows for more flexibility in handling non-stationarity in the data. See also patent application publication WO 2011/139411.

Patch-Based Methods

The most common way to apply signal processing algorithms that assume a stationary input to data that are not stationary is (see FIG. 1) to break up the problem into a series of overlapping patches that are then assumed to be locally stationary (step 10), followed by the desired processing of each window independently (step 12), followed by reassembly of the processed patches (step 14). This approach is widely used in slope estimation (Claerbout, *Earth Soundings Analysis: Processing versus Inversion*, Blackwell, page 91 (1992)), interpolation (Spitz, *Geophysics* 56, 785-794 (1991)) and signal noise separation methods such as f-x deconvolution (Canales, *SEG Expanded Abstracts* 3, 525-527 (1984)) that all assume that the data are composed of one or more superimposed planar events. The benefit of the patch-based approach is efficiency in two dimensions. One drawback is relatively poor scaling to higher dimensions as the amount of overlap increases with dimensionality. Another drawback is the possibility that individual patches can produce an unexpected result that either produces visible patch boundaries in the merged result or, if the patch overlap is considerable, this problematic patch is averaged with the surrounding patches to produce errors that are difficult to track.

Non-Stationary Filtering

An alternative to the patch-based approach is to solve for filters that vary as a function of position. One example of this is the use of non-stationary prediction-error filters for either interpolation (Crawley et al., *SEG Expanded Abstracts*, 1999, Vol. 18, Pages 1154-1157) or signal/noise separation (Guitton, *Geophysics*, 2005, Vol. 70, Pages V97-V107). This spatially variable filter is estimated on the entire dataset simultaneously by solving a large inverse problem for all of the filter coefficients. Since these filters vary with position, the number of unknown filter coefficients can be larger than the number of known data points, creating an underdetermined problem that is solved by adding regularization to create a smoothly non-stationary prediction-error filter. This has the benefit that the filter varies smoothly as a function of position and does not have the problem with visible boundaries that the patch-based approach does. However, creating a nonstationary filter is nonunique, so many of the benefits of a prediction-error filter that depend on solving an overdetermined unique problem are gone, such as a guarantee of minimum phase, among other benefits. The size of the filter also scales poorly with the number of dimensions involved, making higher-dimensional filtering computationally expensive.

Another nonstationary filter often used is a local plane-wave destructor filter (Fomel, *Geophysics* 67, 1946-1960, (2002)) or a steering filter (Clapp, *Geophysics* 69, 533-546 (2004)). These filters are stable and can be used to estimate local slope. This method is efficient, but when dealing with data with multiple conflicting slopes has difficulty and can alternate rapidly between the two possible slopes. Spatially aliased data also present problems as there are multiple possible solutions to the slope estimation problem.

A more recent approach to dealing with nonstationarity is from Hale (*SEG Expanded Abstracts* 26, 3160-3164 (2006)). Hale efficiently computes Gaussian windows in time and space using both the separability of multidimensional Gaussians as well as recursive filtering that he uses to solve for local cross-correlations and auto-correlations of data, which he can then use to generate local prediction-error filters. This method works well, but assumes that the data are well-sampled. Hale uses this same efficient Gaussian smoothing to smooth the output of slope estimation from a structure tensor. Current uses of Gaussian filtering in time and space are limited to methods that depend on efficient cross and auto correlations, and for smoothing the output of other processes. Moving to a domain where prior information is more easily enforced, such as the frequency-wavenumber domain, is not straightforward with this approach.

The S transform (Stockwell, Mansinha and Lowe, *IEEE Signal Processing*, 1996, Vol. 44, Pages 998-1001; Pinnegar and Mansinha, *Geophysics*, 2003, Vol. 68, Pages 381-385; and U.S. Pat. No. 7,617,053 to Pinnegar et al.) uses modulated Gaussian functions for time frequency analysis, but only along in a single dimension as an alternative to a spectrogram.

Gabor filtering (Daughman, *IEE Trans. On Acoustics, Speech, and Signal Processing*, 1988, Vol. 36, Pages 1169-1179), used in image analysis and edge detection, uses modulated Gaussian functions in multiple spatial dimensions. These filters are typically parameterized by a rotation and dilation, making them non-separable. Since applications are limited to 2 or 3 spatial dimensions, separability and parallelization are less of an issue than with higher-dimensional seismic data. In addition, using this type of filter on data with time and spatial axes might be confusing, as the rotation would span different frequency ranges depending on the rotation.

Curvelets

Another approach to the problem of nonstationarity is to use local basis functions. The curvelet transform (U.S. Pat. No. 7,840,625 by Candes et al) is a transform that is a partition of the frequency-wavenumber domain where the data are broken up into various sized windows in scale and angle according to a parabolic-dyadic scaling law, and then each window is returned to the time-space domain on a different grid by an inverse Fourier transform to produce an output in angle, scale, time, and space.

Curvelets have largely been used for compressive sensing, where the compressive qualities of curvelets on seismic data are used to eliminate noise or interpolate missing data. This method works provided that certain underlying assumptions are fulfilled. For the interpolation case, this is that the data are randomly sampled, producing a low-amplitude blur in both the frequency-wavenumber and curvelet domains. For a signal/noise case, an adaptive subtraction of externally modeled noise can take place in the curvelet domain. Curvelets address the problem of nonstationarity, and work when simple operations such as thresholding or subtraction take place in the curvelet domain.

Applying operators across this curvelet domain is difficult, as the grid spacing and orientation differ for each scale and angle. Additionally, the parameterization of the curvelet space is difficult, as the parameters of scale and number of angles are not intuitive. Finally, curvelets become computationally expensive in higher dimensions, where the gridding and overrepresentation of the data increase greatly.

Many methods have been published for fault detection and tracking in seismic data, including the following: U.S. Pat. No. 6,018,498 to Neff, et al.; PCT patent application publication WO 2009/082545 by Kumaran et al.; U.S. patent application publication US 2006/0122780 by Cohen et al. (other fault detection references are listed by Cohen in his paragraph 35); U.S. patent application publication US 2002/0035443 by Matteucci et al; and U.S. Pat. No. 5,940,778 to Marfurt et al.

No single method deals with nonstationarity in a way that is stable, easily parallelizable, easily scalable to higher dimensions, and easily incorporates prior knowledge. The present invention satisfies these requirements.

SUMMARY OF THE INVENTION

One embodiment of this disclosure is a method for producing a representation of a subsurface region from multi-dimensional seismic data, comprising (a) using a cascade of filtering operations to decompose the seismic data into components in a frequency-wavenumber domain wherein the data are represented in terms of tiled windows;

(b) applying one or more processing operations to the decomposed data, said processing operations being designed to enhance a representation of the subsurface region from the seismic data;

(c) applying the filtering operations' adjoint operations to the decomposed data after the processing operations, then summing data components weighted by normalization factors computed to produce a flat impulse response; and (d) using the weighted and summed data from (c) to generate a representation of the subsurface region.

The preceding method is advantageous where the processing operations require an assumption of local stationarity and the data are not stationary, that is that the dip or frequency spectra of the seismic data change with position and time. The cascade of filtering operations may be a series of 1D Gaussian filters modulated by complex exponentials, creating a series of Gaussian windows in the frequency-wavenumber domain.

One embodiment of the present invention is a computer-implemented method for automatically tracking faults in a 2-D or 3D seismic data volume or cross-section, comprising:
(a) decomposing the seismic data into local slownesses for seismic data recorded in time, or slopes if the seismic data have undergone depth migration, using a programmed computer; and (b) identifying voxels in the seismic data which when decomposed into slownesses or slopes span a broader range of slownesses or slopes than other voxels in the seismic data, thereby forming a fault-highlighted data volume or cross-section.

The method may further comprise: (c) selecting one or more initial seeds for fault surfaces or fault lines within the fault-highlighted data volume or cross-section based on the fault highlights; (d) generating one or more fault contours in the fault-highlighted data volume or cross-section starting from the initial seeds; and (e) outputting a connected, smooth fault surface or line based on the one or more fault contours.

As with any seismic data processing method, the invention in practical applications is highly automated, i.e. is performed with the aid of a computer programmed in accordance with the disclosures herein.

BRIEF DESCRIPTION OF THE DRAWINGS

The present invention and its advantages will be better understood by referring to the following detailed description and the attached drawings in which:

FIG. 5 shows an input zero-offset section of a synthetic 2D marine dataset, with variable slopes and multiple crossing spatially-aliased events;

FIG. 6 shows absolute value of the 2D Fourier Transform of the input data of FIG. 5 after placing two zeroed traces between each recorded trace; note the crossing aliased events;

FIG. 7 shows the result of interpolation using GaSPs of the present disclosure; the curved aliased events of FIG. 5 have been correctly interpolated;

FIG. 8 shows absolute value of 2D Fourier Transform of the interpolated result of FIG. 7; note that the crossing aliased events of FIG. 6 have been recovered;

FIG. 9 shows adaptive subtraction results using both GaSP-based adaptive subtraction and standard matching filters; top left: original data; top right: multiple model; middle left multiples after standard matching filters; middle right: multiples after GaSP-based adaptive filtering; bottom-left: standard adaptive subtraction; bottom-right: GaSP-based adaptive subtraction;

FIG. 10 shows a subset of the GaSP-decomposed results at x=2000 m, f=29 Hz, shown in time (vertically) and slowness (horizontally), from left to right: Original data, multiple model, standard match-filtered multiple model transformed to the GaSP domain, GaSP match-filtered multiple model, standard adaptive subtraction transformed to the GaSP domain, GaSP adaptive subtraction;

FIG. 11 shows a subset of the GaSP-decomposed results at p=-0.38 ms/m, f=29 Hz, shown in time and space; Top left: original data; top right: multiple model; middle left multiples after standard matching filters; middle right: multiples after GaSP-based adaptive filtering; bottom-left: standard adaptive subtraction; bottom-right: GaSP-based adaptive subtraction;

FIG. 12 shows a subset of the envelope of the GaSP-decomposed results at x=2000 m, t=0.05 s, shown in slowness (vertically) and frequency (horizontally), from left to right: original data, multiple model, standard match-filtered multiple model, GaSP match-filtered multiple model, standard adaptive subtraction, and GaSP adaptive subtraction.

The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The present disclosure presents an alternative to existing methods to address non-stationary data, an alternative that allows for more flexibility in handling non-stationarity in the data, by allowing the incorporation of prior knowledge along many dimensions in the data: spatial, temporal, and their Fourier equivalents. This disclosure explains how to construct a representation that scales in an easily parallelizable way to higher dimensions, and can be used for interpolation, signal/noise separation, and decomposition of seismic data. This invention is applicable to multidimensional seismic signal processing, both before and after imaging. The invention allows for a straightforward method to process data in frequency, time, and multiple spatial axes and slopes, or any subset of these, all simultaneously.

Figure 1:
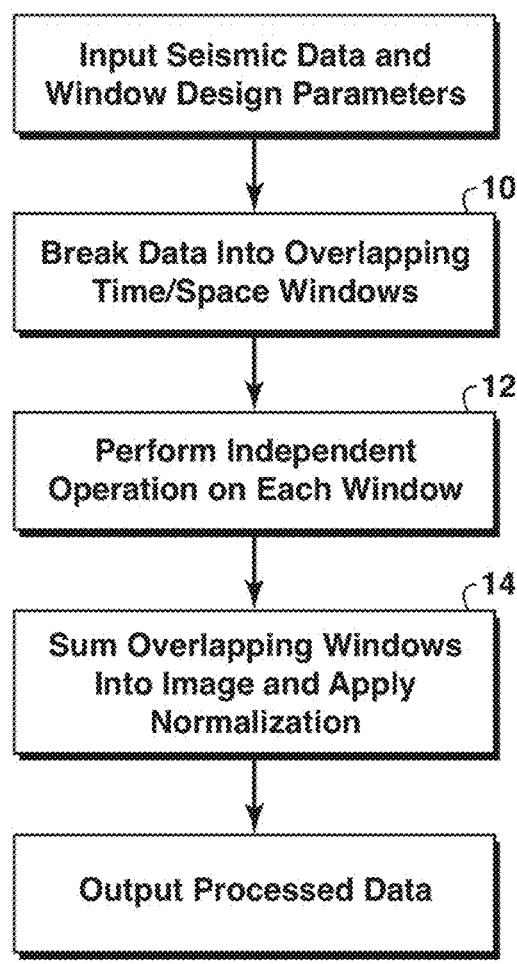
FIG. 1 is a flow-chart showing a conventional patch-based approach to dealing with nonstationary data.
Figure 2:
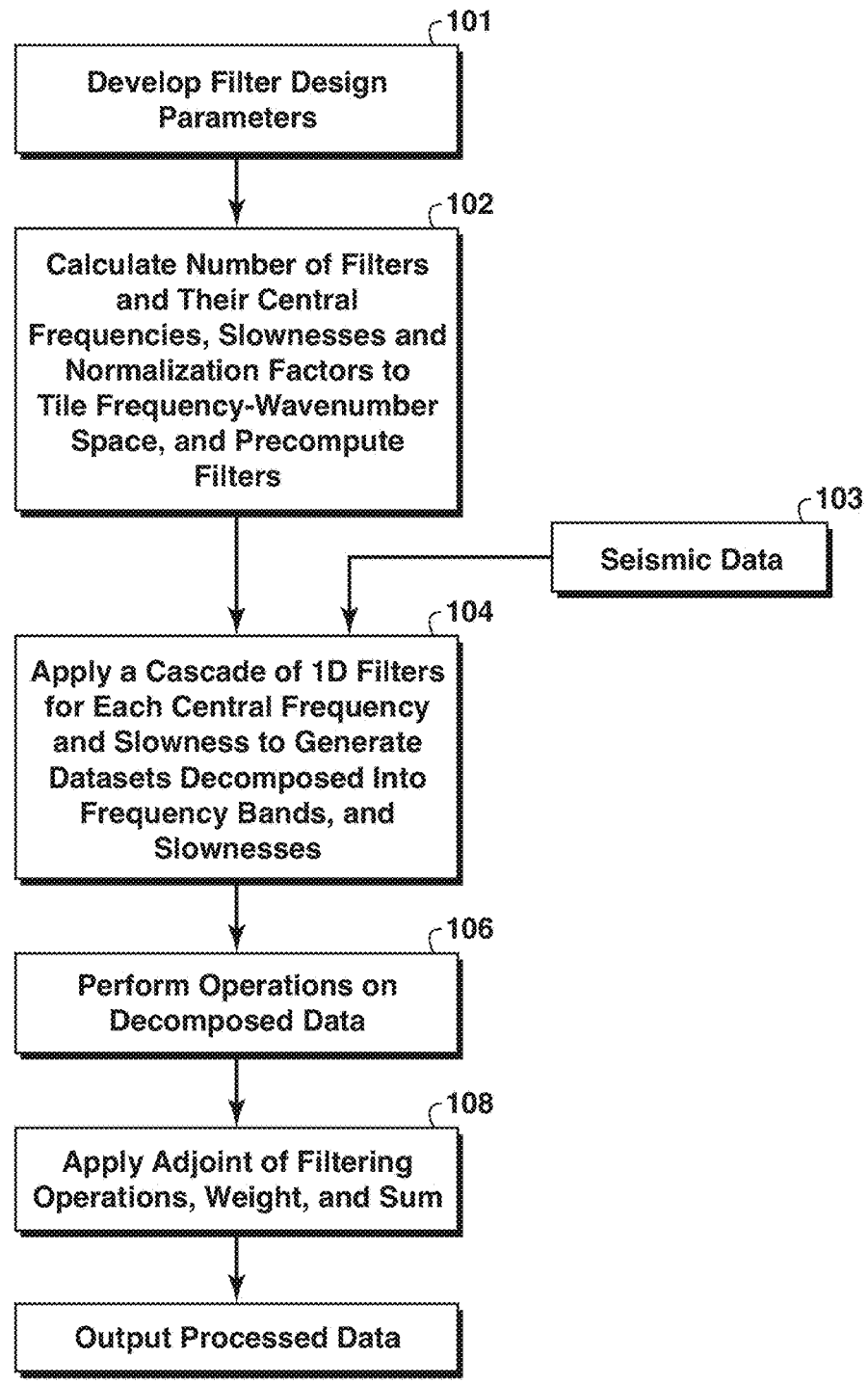
FIG. 2 is a flowchart showing basic steps in one embodiment disclosed herein for performing data processing operations on seismic data, where the data processing operations assume data stationarity.

FIG. 1 is a flow chart describing a traditional patching approach described in the "Background" section, while FIG. 2 is a flow chart showing basic steps in one embodiment of the method disclosed herein for processing data with a processing technique that assumes data stationarity. (See related application U.S. Ser. No. 13/639,802, published as US 2013-0044568.) In the method of FIG. 2, one begins by first applying windowing operations, not in time and space as in FIG. 1 but in frequency and wavenumber. This windowing in frequency and wavenumber is done implicitly by a cascade of separable one dimensional time and spatial filtering operations. These filters are Gaussian functions modulated by a complex exponential. By using a variety of these filters, the input data can be decomposed into a series of slopes and frequencies that can be reassembled to the original by applying the adjoint operation followed by a weighted sum. This decomposed domain of time, space, frequency and slowness can be used as a domain where a priori information about the output can be applied in a straightforward manner.

The method of FIG. 2 uses a cascade of one-dimensional Gaussian filters coupled with complex exponentials to create a tiling of overlapping Gaussian data-sampling windows in the frequency and wavenumber domains. The method of tiling the frequency and wavenumber domains may be directed toward pre-stack seismic data, where the tiling is in frequency and slowness. For an example in depth, the depth axis could be treated in a similar fashion to an additional spatial axis, meaning a regular tiling when the time axis is not present.

Separable Multidimensional Modulated Gaussian Filtering

The derivation of the one-dimensional Gaussian filters starts with a pair of desired multidimensional Gaussian windows in frequency (f) and wavenumber (k) with a central frequency and wavenumber $f_0$ and $k_0$, and half widths at half maxima $h_f$ and $h_k$ for the frequency and wavenumber axes, respectively, where $$G_{f_0 k_0}(f, k) = e^{-\left(\frac{(f-f_0)^2 \ln 2}{h_f^2} + \frac{(k-k_0)^2 \ln 2}{h_k^2}\right)} + e^{-\left(\frac{(f+f_0)^2 \ln 2}{h_f^2} + \frac{(k+k_0)^2 \ln 2}{h_k^2}\right)}. \quad (1)$$

This two dimensional filter can be separated into two products of two Gaussian functions that have been convolved with shifted delta functions so that $$G_{f_0 k_0}(f, k) = \left(\delta(f - f_0) * e^{-\left(\frac{f^2 \ln 2}{h_f^2}\right)}\right)\left(\delta(k - k_0) * e^{-\left(\frac{k^2 \ln 2}{h_k^2}\right)}\right) + \\ \left(\delta(f + f_0) * e^{-\left(\frac{f^2 \ln 2}{h_f^2}\right)}\right)\left(\delta(k + k_0) * e^{-\left(\frac{k^2 \ln 2}{h_k^2}\right)}\right). \quad (2)$$

This sequential application, or cascade, of filters can be performed in the time and space domain as the convolution of two 1D filters, each composed of a Gaussian multiplied by a complex exponential, where $$g_{f_0 k_0}(t, x) = \frac{\pi h_f h_k}{\ln 2} \left[\left(e^{i 2\pi f_0 t} e^{-\frac{\pi^2 t^2 h_f^2}{\ln 2}}\right) * \left(e^{i 2\pi k_0 x} e^{-\frac{\pi^2 x^2 h_k^2}{\ln 2}}\right) + \\ \left(e^{-i 2\pi f_0 t} e^{-\frac{\pi^2 t^2 h_f^2}{\ln 2}}\right) * \left(e^{-i 2\pi k_0 x} e^{-\frac{\pi^2 x^2 h_k^2}{\ln 2}}\right)\right]. \quad (3)$$

If $f_0$ is larger than $h_f$, this addition of two cascaded series of filters can be approximated by taking two times the real portion of the output of one of these filters, so that $$g_{f_0 k_0}(t,x) * d(t,x) = \frac{2\pi h_f h_k}{\ln 2} \text{Re}\left[\left(e^{i2\pi f_0 t} e^{-\frac{\pi^2 t^2 h_f^2}{\ln 2}}\right) * \left(e^{i2\pi k_0 x} e^{-\frac{\pi^2 x^2 h_k^2}{\ln 2}}\right) * d(t,x)\right]. \quad (4)$$

In an alternate embodiment, in the case where very low and zero frequencies are desired, the above implementation can be replaced by applying both cascades of filters in equation 3 separately to produce separate complex outputs.

The half widths at half maxima of the filters can be expressed either in time/space or frequency/wavenumber using the relation $h_f = \ln 2/\pi h_t$ depending on the desired input parameterization and tiling, discussed in detail next.

Implicit Tiling of the Frequency/Wavenumber Domain

Another feature of this invention is a method of tiling of the frequency wavenumber domain in a manner best suited for pre-stack seismic data.

Figure 3:
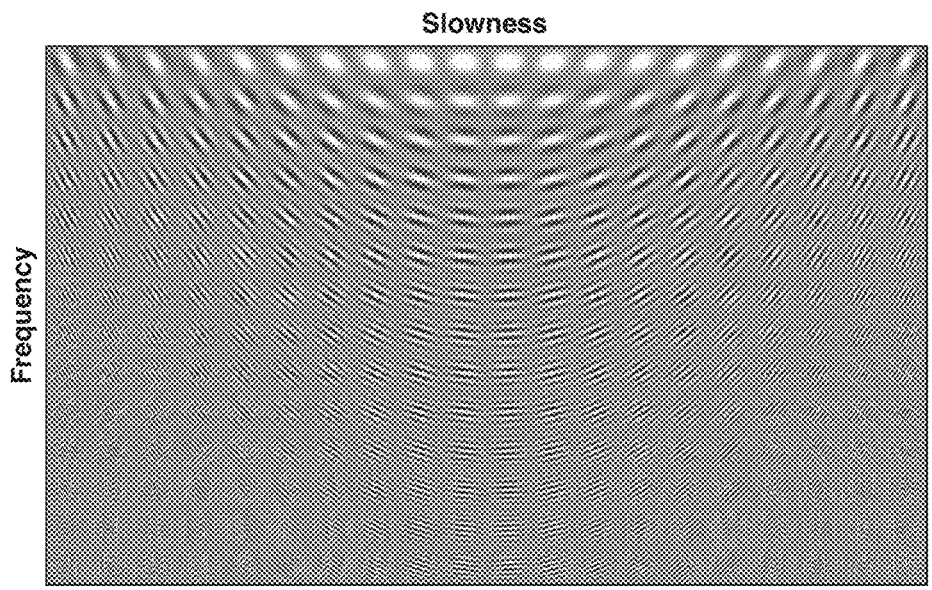
FIG. 3 shows examples of 2D Gaussian slowness-period packets generated by cascaded 1D filtering, where slowness varies from left to right and frequency (f) from top to bottom.
Figure 4:
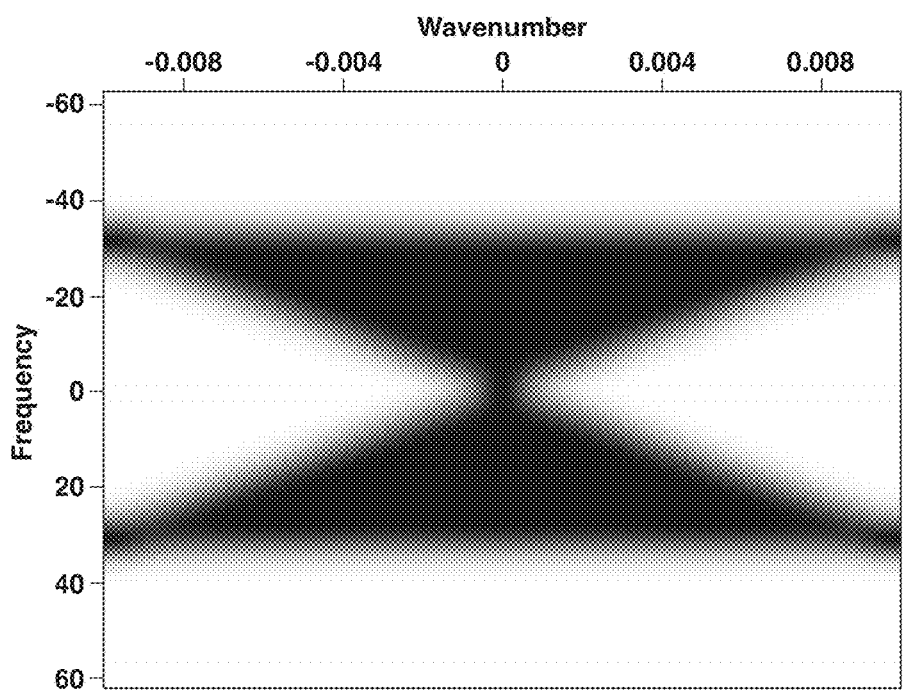
FIG. 4 shows frequency impulse response (black is 1, white is 0) after applying the forward and adjoint transform using the filters shown in FIG. 3.

Frequency sampling should be such that the impulse response of the cascaded forward and adjoint operator is flat. For the forward operator, the Gaussians should be shifted by $h_f$ or less relative to each other such that the windows sum to produce a flat response. When $n_f$ Gaussian windows are applied across the frequency axis with a half-width in time of $h_t$, the corresponding frequency half-width after the forward and adjoint operations is $\sqrt{2} \ln 2/\pi h_t$. Setting the frequency sampling equal to this value gives $$W_f = \sum_{m=-(n_f-1)/2}^{(n_f-1)/2} 2e^{-\frac{\pi^2 h_t^2}{\ln 2}\left(\frac{f_{max}-f_{min}}{2} - m\frac{\sqrt{2} \ln 2}{\pi h_t}\right)^2} \quad (5)$$

as a normalization factor to rescale the frequency response to unity after the forward and inverse transforms. In equation (5), $f_{max}$, and $f_{min}$ are the specified minimum and maximum central frequencies of the time-domain Gaussian windows. The tiling in wavenumber for prestack seismic data is best suited to a regular tiling in slowness, with spacing in slowness such that the tiling along wavenumber at the maximum frequency produces a flat impulse response. This maximum spacing is given by the half-width of the operator, either in wavenumber or in space, and is $\sqrt{2} h_k$ or $\sqrt{2} \ln 2/\pi h_x$ and the sampling interval in p, $\Delta p$, is this value divided by the maximum frequency. (p is the slowness, which is related to the wavenumber k by k=fp.) At each output frequency, this constant sampling in p will produce a different normalization factor roughly equivalent to the $\omega$ scaling needed by a tau-p transform, and is $$W_p(f) = \sum_{l=-(n_p-1)/2}^{(n_p-1)/2} 2e^{-2\frac{(2\pi h_x l \Delta p f)^2}{\ln 2}}, \quad (6)$$

where $n_p$ slownesses are sampled. This product of the present disclosure may be called Gaussian slowness-period packets ("GaSPs"), represented by g in the equations above. A collection of these GaSPs" is shown in FIG. 3, where adjacent GaSPs on the horizontal axis vary in slowness and adjacent GaSPs on the vertical axis vary in frequency. The frequency response of the forward and adjoint application and weighting of these GaSPs is shown in FIG. 4, where black indicates a value of 1 and white indicates 0. The frequency response in this case is nearly perfectly flat within the desired region of interest to more than six significant digits, with the response within four significant digits of unity.

Combining the two concepts of the separable Gaussian functions and the frequency-slowness tiling produces a transform that can be used in the following steps, as described in FIG. 2.

At step 101, given desired input parameters, including a desired frequency and slowness range and either time or spatial half-width of operators, desired frequency and slowness discrimination, or the number of desired central frequencies and slownesses, define a tiling so that the impulse response is flat after a forward and inverse transform, which corresponds to a spacing equal to $1/\sqrt{2}$ times the half-width of the operators in frequency and in slowness.

At step 102, precompute the necessary 1D filters required for the tiling, which is (approximately $n_f+n_fn_p$ filters) as well as the $n_f+1$ normalization factors to produce a flat impulse response after forward and adjoint transforms.

At step 104, for each desired central frequency and slowness defined in step 101, apply a cascade of 1D modulated Gaussian filters to the seismic data 103 to generate a filtered version of the data for each central frequency and central slowness. It may be noted that the terms slope, dip, and slowness may be used more or less interchangeably, with slowness more applicable to an unimaged seismic data case, where the axes are time and space, whereas slope or dip are commonly used when dealing with imaged or migrated data, where the axes are often x, y, and depth.

At step 106, apply an operation or operations to the transformed datasets. These operations could include element-by-element operations such as muting or thresholding, operators that span any of the axes of the datasets: the time axis, spatial axes, slope axes, or the frequency axis, such as applying filters along any of these axes. In general, these are data processing operations that are usually performed in the transform domain where they must assume data stationarity. Alternately, this decomposition could be done for two or more datasets and operations performed on the combination of datasets.

At step 108, apply the adjoint operation by reapplying the same filters to the decomposed data, followed by a sum weighted by the normalization factors computed in step 102.

The flowchart and examples below are for the 2-D case, with time and space transforming to frequency and wavenumber. However, it can be appreciated that the separable Gaussian filters and transform tiling described here really apply to any number of dimensions, which may include as many as seven: three spatial dimensions for each of the source and the receiver, and time, although if source and receiver are located on the Earth's surface, the number reduces to five. In fact, it is a particularly advantageous feature of this inventive method that it has beneficial scaling and efficiencies in higher dimensions that other local transforms lack.

EXAMPLES

Beyond-Aliasing Interpolation

A commonly-used interpolation method for pre-stack reflection seismic data is f-k interpolation (Gülünay, Geo-

*physics* 68, 355-369 (2003)) where regularly-sampled data can be interpolated correctly despite the Shannon-Nyquist sampling criterion by incorporating prior information; in this case the prior information is a weighting function generated from the low frequencies present in the data. This is typically accomplished in the Fourier domain, and as such assumes stationarity, so the method is typically applied in overlapping spatial-temporal patches.

Gaussian slowness period packets can be used instead of these windows, and the problem can be reformulated so that the lower-frequency GaSPs are used to constrain the higher-frequency GaSPs, and remove the aliased energy caused by the coarse sampling.

Figure 5:
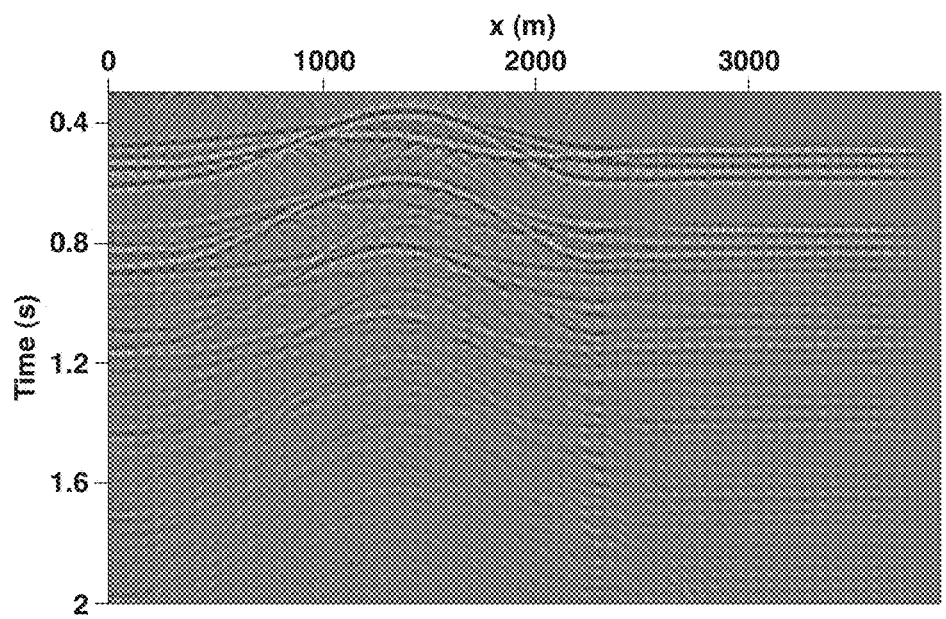
FIGS. 5-12 illustrate example applications of the method of FIG. 2, where.
Figure 6:
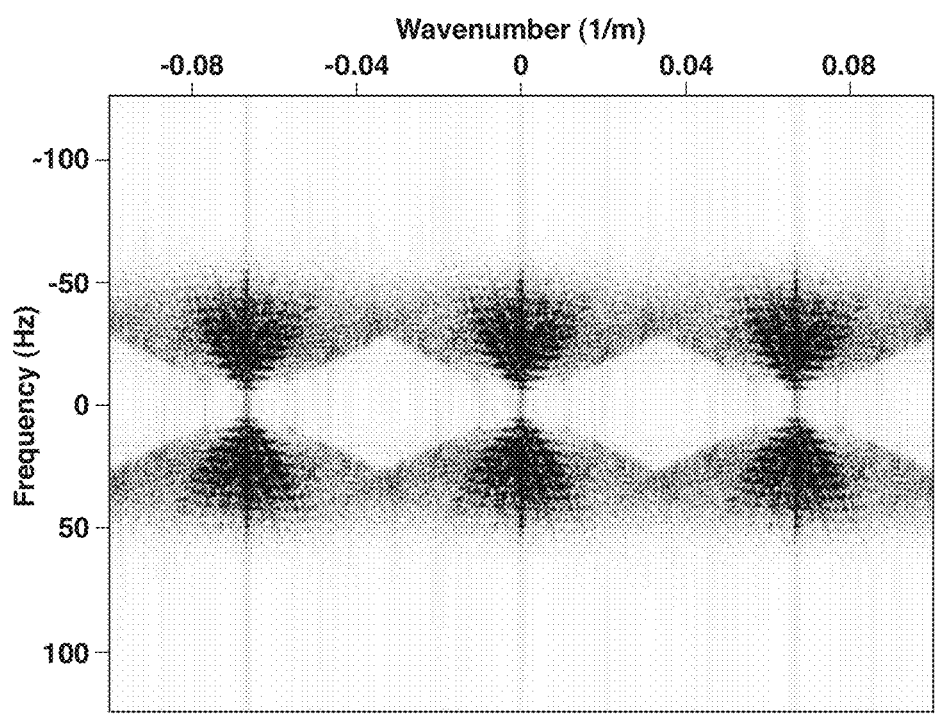

An example of this is shown in FIG. 5, which is the zero-offset section from a synthetic 2D marine dataset after interleaving two empty traces between each pair of live traces. The slopes vary as a function of both position and time, there are multiple crossing aliased slopes, and the dynamic range varies widely. The f-k transform of these data (after interleaving two empty traces between each pair of live traces) in FIG. 6 shows two replicas originating at the positive and negative Nyquist wavenumbers of the original sampling.

Figure 7:
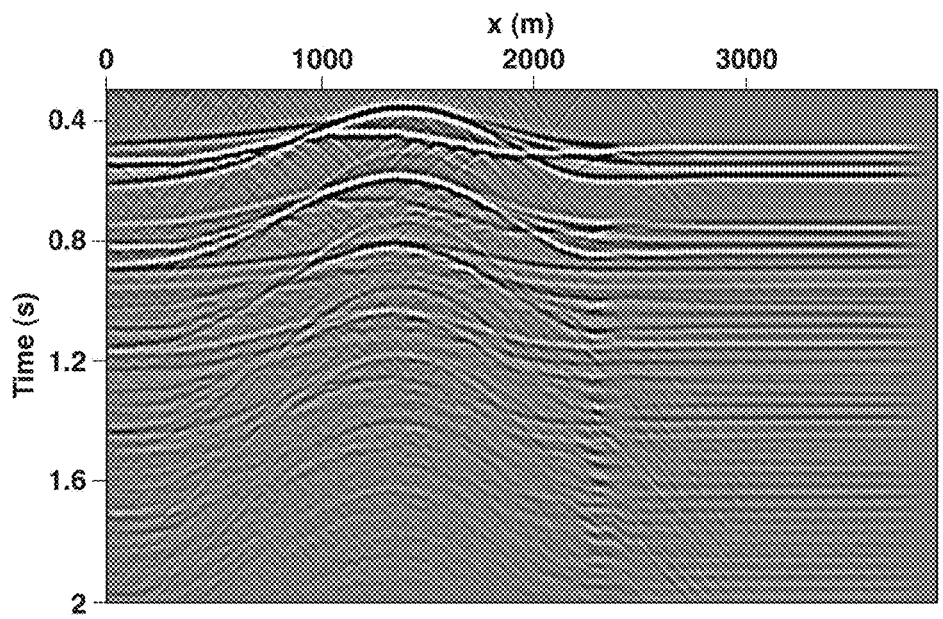
Figure 8:
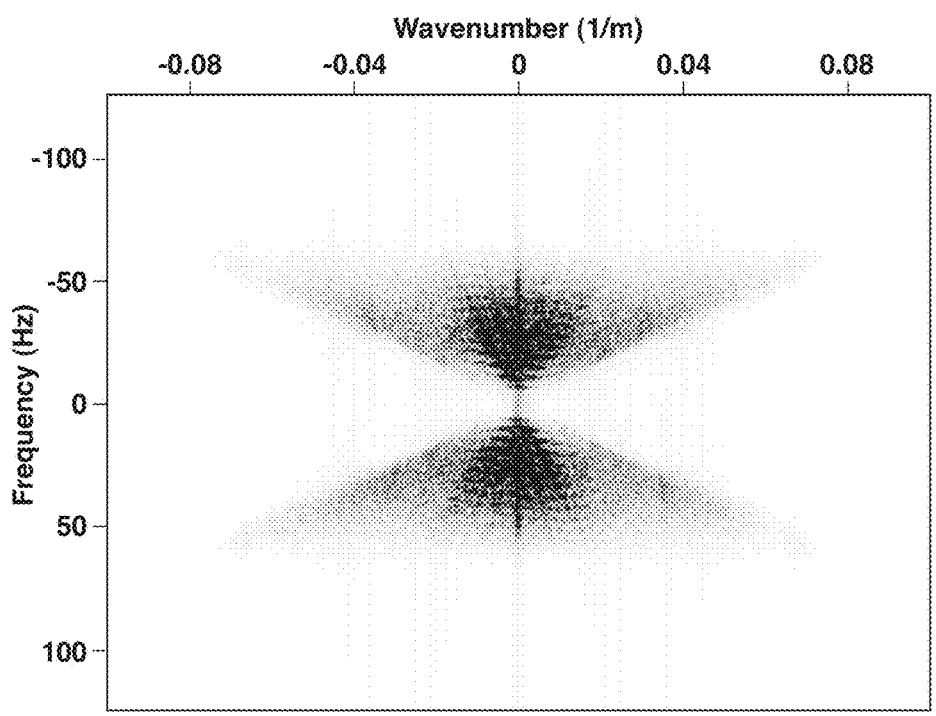

Applying GaSP-based Gülünay factor-of-three interpolation to the live traces in FIG. 5 produces the output in FIGS. 7 and 8 in time-space and frequency-wavenumber, respectively. The aliasing has been nearly entirely removed and multiple curved crossing events have been successfully interpolated. The algorithm applied used only one-dimensional filtering operations, first to generate the GaSPs from the input data, secondly to create the weighting function by creating a second series of GaSPs generated at frequencies that were ⅓ (the inverse of the interpolation factor) of the GaSPs created earlier, followed by application of the weighting function and the adjoint transformation of each GaSP that is another application of the 1D cascade of filters followed by weighted summation for the final interpolated output.

Match Filtering of Multiples

Match filtering typically takes place using a filter in time and/or space to match a noise model to a dataset containing the noise as well as desired signal (Verschuur and Berkhout, *Geophysics,* 1992, Vol. 57, Pages 1166-1177). More recently, curvelet-based adaptive subtraction has been used to fit a noise model to data, both using real (Herrmann et al., *Geophysics,* 2008, Vol. 73, Pages A17-A21) and complex-valued curvelets (Neelamani et al., *SEG Expanded Abstracts,* 2008, Vol. 27, Pages 3650-3655). The matching filters can have difficulty discriminating overlapping signal from noise, but deal well with bulk shifts between the modeled and actual noise because of the length of the filter in time, while the curvelet-based approaches decompose across scale and angle, but currently do not deal well with large shifts between the modeled and actual noise. By using matching filters on a GaSP-decomposed noise model and data, both overlapping slopes and frequencies and significant kinematic differences can be addressed.

Figure 9:
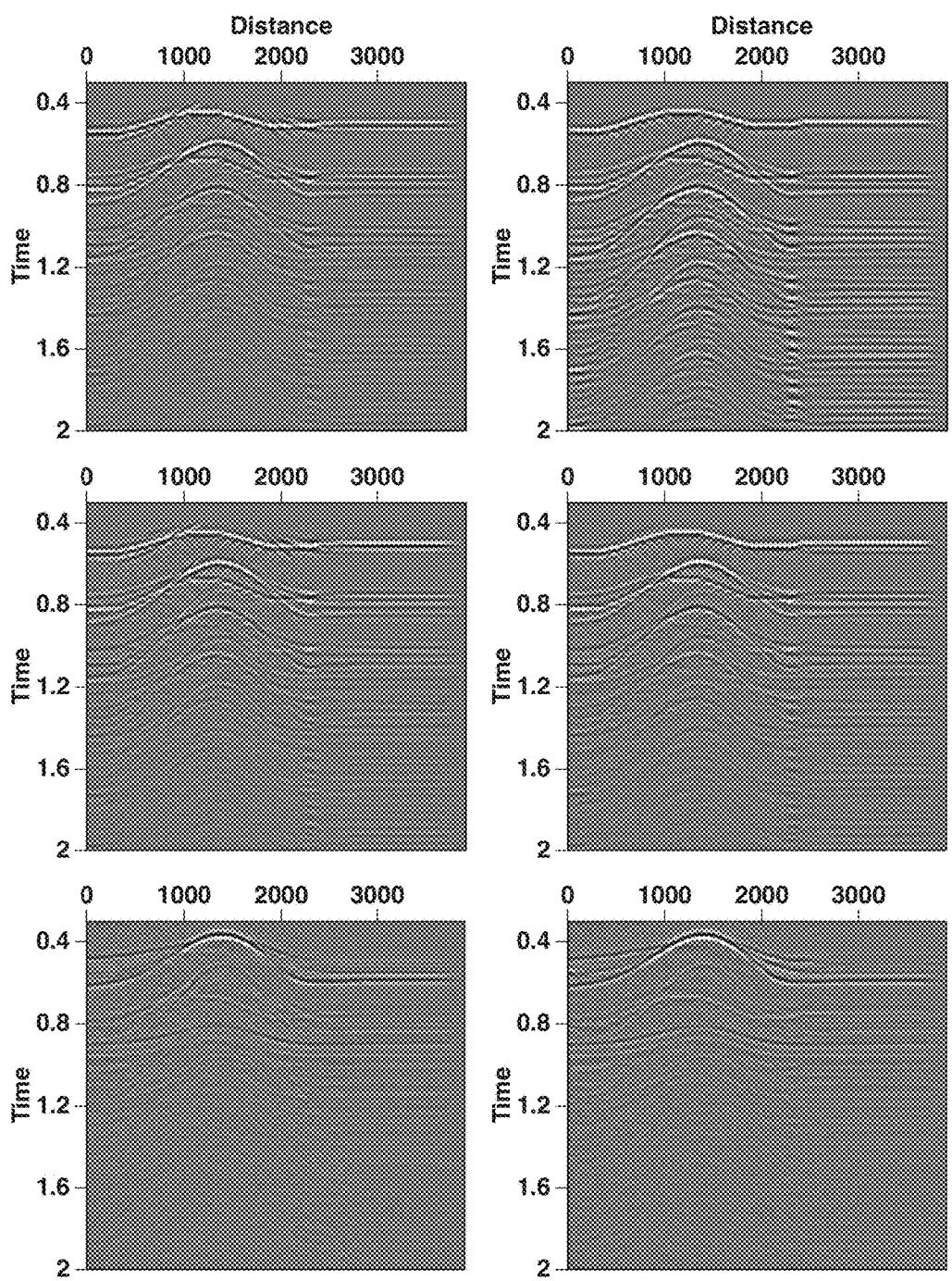

The top-left panel of FIG. 9 shows the input dataset containing both primary reflections and multiples, most notably at early arrival times around 0.4-0.5 s in both the input data and the input multiple model in the top-right panel. Using a standard least-squares adaptive subtraction technique on these two panels produces the matched multiple model on the center-left panel. This matched multiple model clearly contains some of the primary information not present in the input multiple model, especially at 0.4-0.5 s at 2000 m. Subtracting these matched multiples from the data produces the undesirable output in the lower left panel of FIG. 9, in which the primaries early in the section are wiped out where the multiples are overlapping with the desired primaries.

Using a GaSP-based adaptive subtraction, where the input data and multiple model are both decomposed into pairs of GaSPs at the same frequencies and slownesses, followed by estimating and applying a set of matching filters with the same parameters as the standard approach for each pair of GaSPs, matching the data and noise independently at each slowness and frequency, followed by the adjoint transformation producing the matched multiples shown in the center-right panel of FIG. 9. These matched multiples do not contain the erroneous dips present in the standard approach. The subtraction of these multiples from the input data produces the result in the lower-right panel, which is a significant improvement upon the standard approach.

Figure 10:
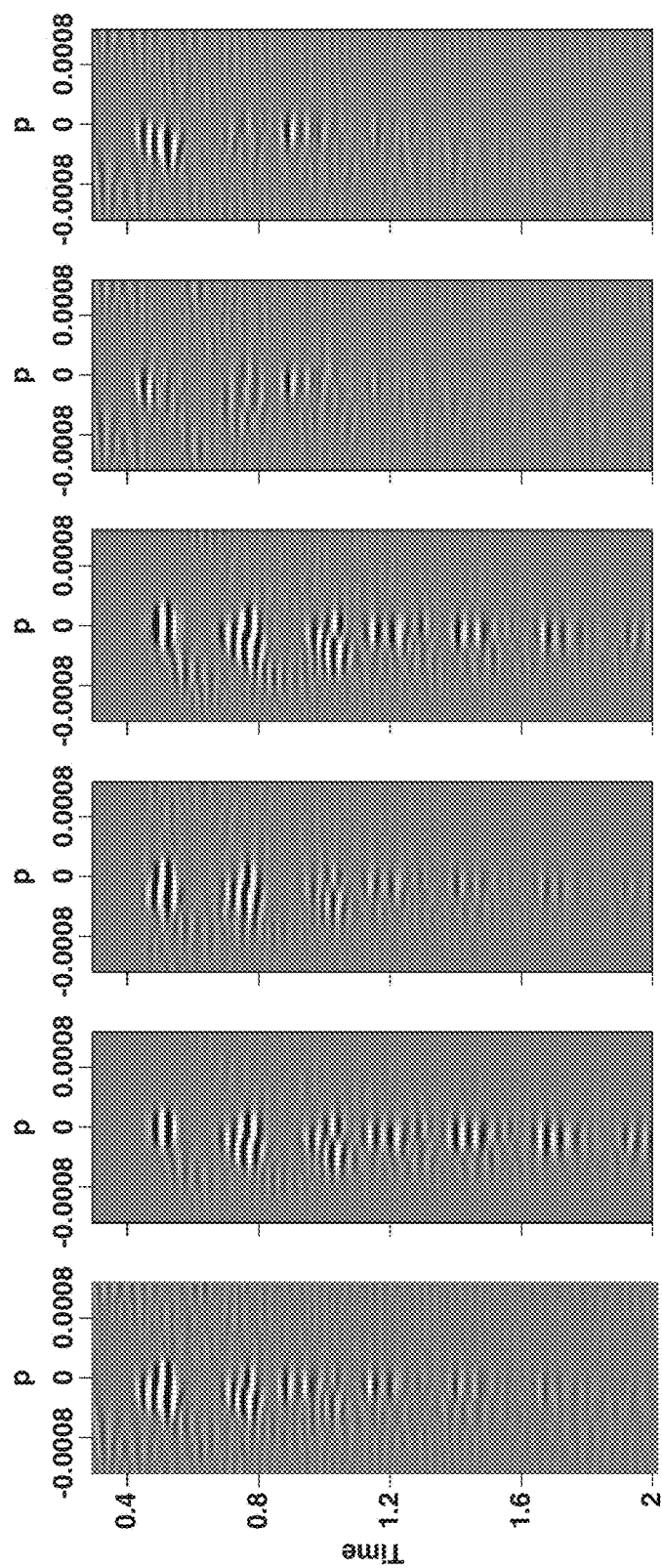

These superior results can also be analyzed by viewing the results of both the GaSP-based and standard approaches in the GaSP-decomposed domain. FIG. 10 shows the GaSP decompositions of all of the panels in FIG. 9, showing all generated slownesses at a single spatial position (x=2000 m) and frequency band (centered at 29 Hz). On the far left, it can be seen that the input data contain a broad range of slownesses at 0.5 s, while the adjacent multiple model contains only a flat event (at p=0) at that time. The third panel is the standard adaptive subtraction, which erroneously increases the slowness range of the multiples to match that of the primaries. The GaSP-based matched multiples in the fourth panel do not spread out across slownesses at this time. The standard adaptive subtraction result in the fifth panel removes this desired energy with non-zero slowness, while the GaSP-based adaptive subtraction in the final panel preserves these dipping primary events.

Figure 11:
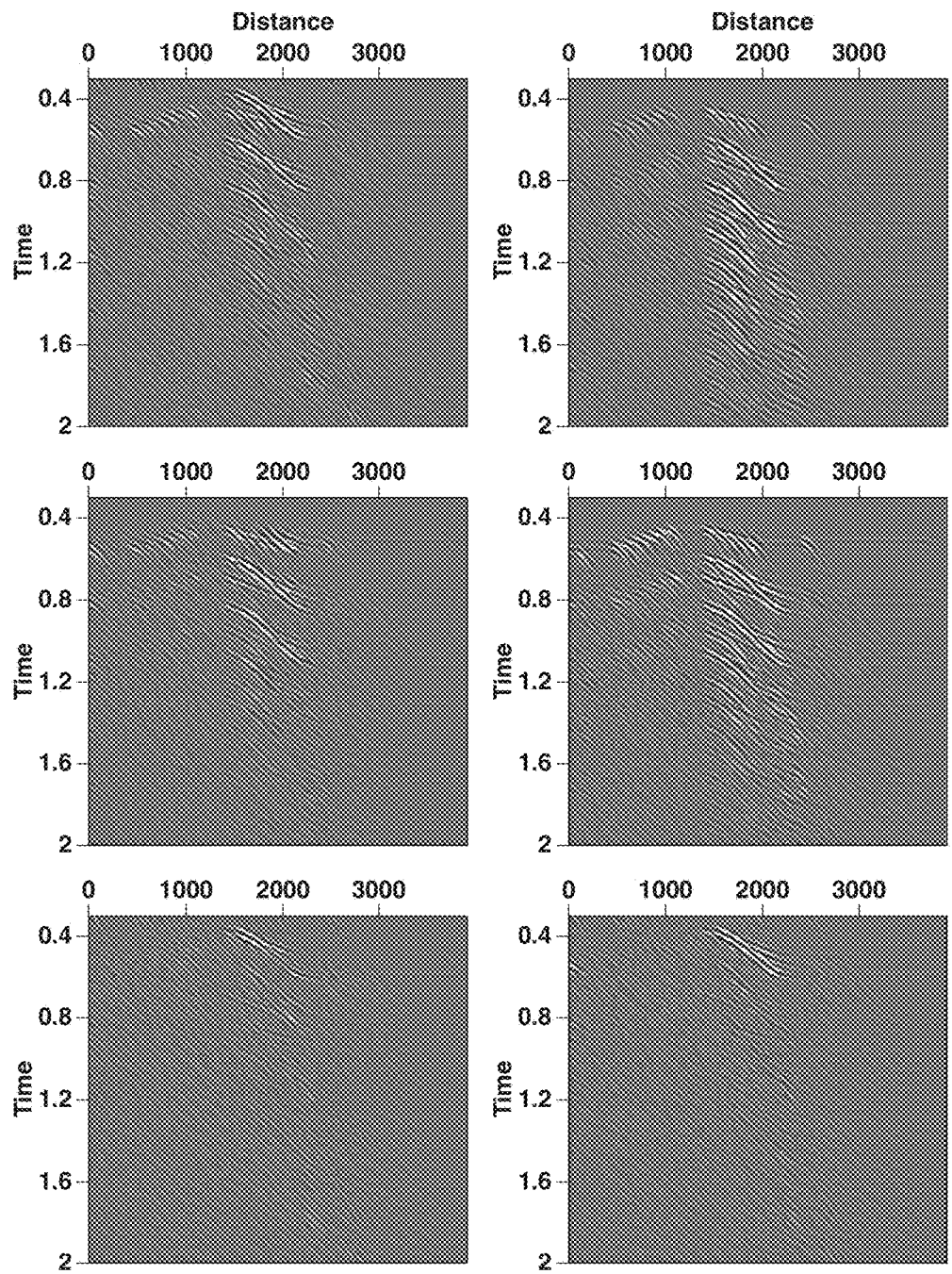
Figure 12:
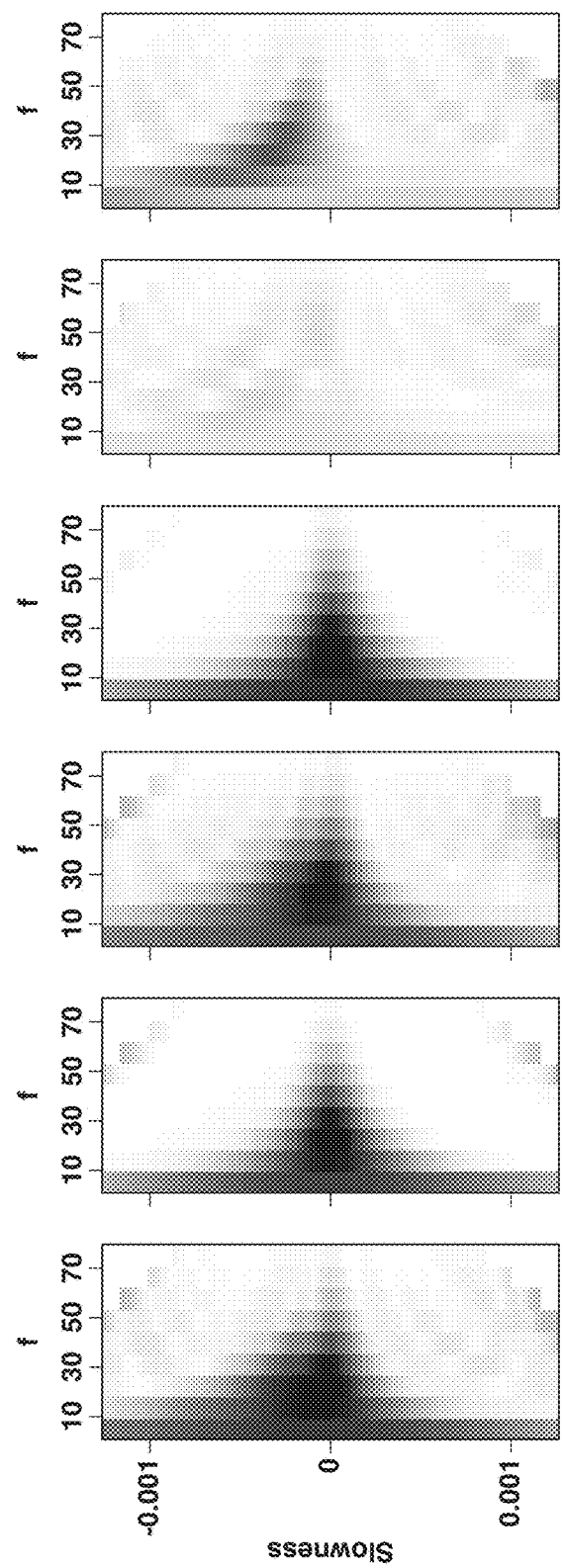

These results can also be examined at a single slowness and frequency at all spatial locations and times as in FIG. 11, or across all frequencies and slownesses at a single location and time as in FIG. 12, where the over-aggressiveness of the traditional adaptive subtraction is very apparent. The standard match filtering destroys all desired signal, while separating the data into slowness and frequency preserves the signal at non-zero slowness, as seen on the rightmost panel.

Fault Detection

Figure 13:
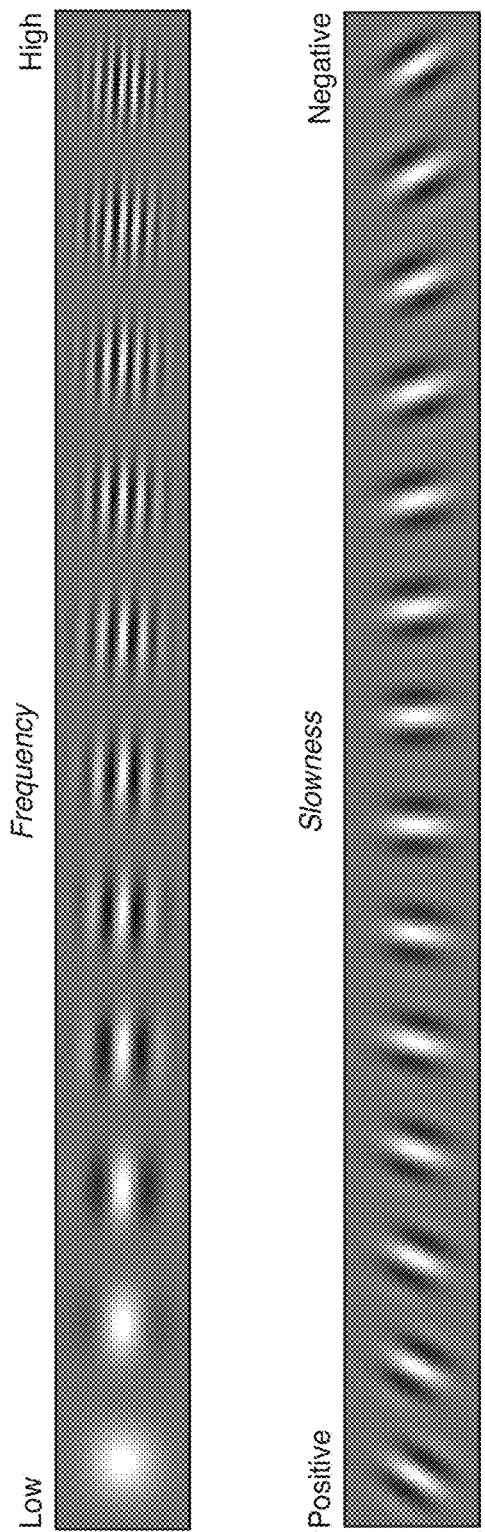
FIG. 13 illustrates the inventive realization that fault discontinuities in the space domain span a wide range in a local slowness (slope) domain, showing data in the space domain and the same data after being transformed to the local slowness domain.
Figure 14:
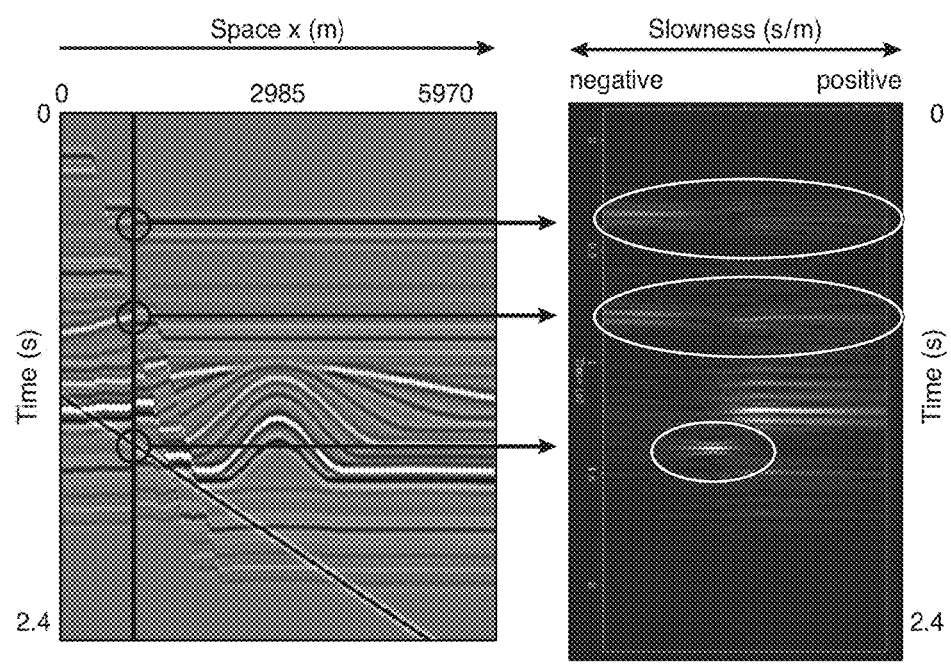
FIG. 14 illustrates how faults and noise look similar in the space domain, but not in the slowness domain.

GaSP-based decomposition of the seismic data into a range of local slowness or slopes may also be used for fault detection, particularly adaptable to being performed in an automated manner using a computer. The inventive realization for how this could work is based on the observation that fault discontinuities in the space domain span a wide range in a local slowness (slope) domain. Imaged seismic volumes have a vertical axis of either time or depth, depending on the type of migration used. Slope or dip is the more accurate term when dealing with an image with a depth axis, whereas slowness is more accurate when the image has a time axis. FIG. 13 illustrates this inventive realization, showing data in the space domain and the same data after being transformed to the local slowness domain. Faults and noise are both often represented as dipping the events in the space domain data. FIG. 14 shows three such dipping events and their corresponding representations in the slowness domain. Noise may tend to be coherent, and hence it will appear focused in the slowness dimension. Therefore, the third dipping event, i.e. the event occurring latest in time can be identified as noise. Faults, however, are represented as a truncation, hence they will appear broadband in the slowness dimension. The two dipping events occurring earliest in time may therefore be identified as faults. (Although not shown in this example, noise may also be incoherent in the slowness domain, but such noise often appears lower in amplitude than the fault truncations and can be distinguished in that way.) Therefore, the local slowness range can be considered as the fault probabilities for each voxel of a 3-D seismic data volume. The local slowness range volume serves as a fault highlighting volume, to which active contours may be fitted to automatically extract the fault surfaces. The automatic generation of these fault surfaces can lead to a better and faster quantitative interpretation of seismic data when exploring for hydrocarbons.

This inventive method preferably uses Gaussian slowness period packets as the local slowness or slope decomposition technique, but it is not limited to GaSP-based decomposition. Other alternatives that could be used to perform this local decomposition into slowness bands include curvelet's, a local radon decomposition, or wave atoms. For curvelet decomposition, see, for example, Candes, et al., "Fast Discrete Curvelet Transforms," *Multiscale Modeling & Simulation* 5, no. 3 (2006): 861-899. (2005). For local radon decomposition, see, for example, Theune, et al., "Least-squares local Radon Transforms for dip-dependent GPR image decomposition," *Journal of Applied Geophysics* 59, 224-235 (2006). For wave atoms, see, for example, Demanet and Ying, "Wave Atoms and Sparsity of Oscillatory Patterns," *Appl. Comput. Harmon. Anal.* 23.3, 368-387 (2007). This paper defines wave atoms, details their implementation, and describes an application to sparse representation of oscillatory textures.

Figure 15:
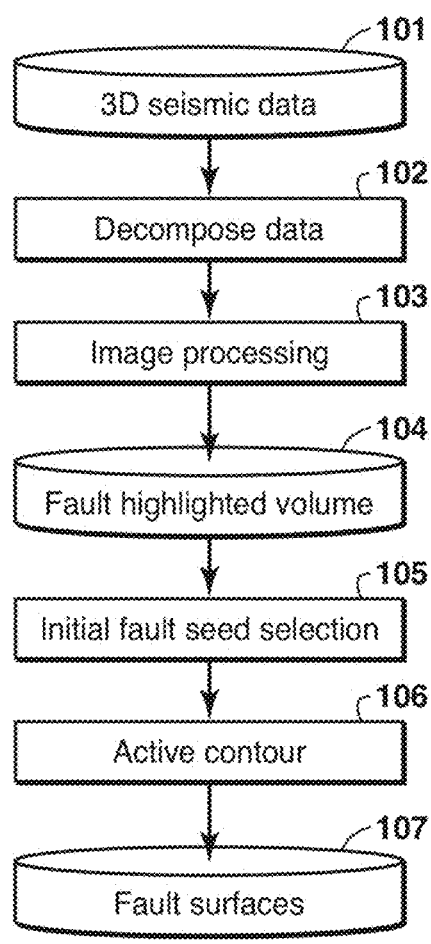
FIG. 15 is a flowchart showing basic steps in one embodiment of the present inventive method for detecting and tracking fault lines or surfaces in 2-D or 3-D seismic data.

FIG. 15 is a flow chart showing basic steps for automatic fault tracking in seismic data using one embodiment of this present inventive method. Initially (step 102) the slowness (slope) decomposition is applied to a 3-D seismic data volume 101. The Next, at step 103, an image processing approach may be applied to the decomposed 5-D volumes (time, two spatial coordinates, and two slowness (slope) coordinates) to further improve the slowness resolution. The local slowness range is then derived from this improved 5-D volume for each voxel point. A high value of local slowness range highlights a high probability of fault at that voxel point. The 3-D local slowness range data may serve as the fault highlighting volume 104. After that, initial seeds of false services may be selected (step 105). Finally, at step 106, an active contour may be started from the selected seeds and may be fitted to the fault highlighted voxels to form connected, smooth fault surfaces 107. As an alternative to active contouring, other framework delineating techniques may be used and are within the scope of the invention. The method of FIG. 15 is not limited to three-dimensional data, and can be applied to fault line extraction from two-dimensional seismic data.

A 2D image may be locally decomposed into slopes to form a 3D volume of depth, space and slope. When a 3D seismic volume is locally decomposed into slopes, the 3D volume now becomes a 5D volume, where in addition to depth and two spatial coordinates, there are two axes corresponding to slopes, either parameterized as slope in the two spatial directions (x and y) or as slope and azimuth (or dip and strike in geological terms). In 2D, a truncated reflector is a point at the end of a line, while in 3D, a truncated reflector at a fault is a line at the end of a plane. For the 2D case, the truncation of a reflector at a fault will span a full range of slopes at that point in space and depth/time. In the 3D case, these truncations will appear as a line (or a blurred version of one) in either slope x/slope y or alternatively as broadband in slope centered at a single azimuth perpendicular to the fault plane.

Active contours, or snakes, are computer-generated curves that move within images to find object boundaries. Its 3D version is often known in the literature by the name of deformable models or active surfaces. They are often used in computer vision and image analysis to detect and locate objects, and to describe their shape. They were designed as a means to integrate geometric continuity information, such as connectedness or smoothness, into the image analysis. Thus, an active contour may be a deformable curve whose deformation is governed by a model component ensuring smoothness and connectedness, and a data component that lets the contour attach itself to the object during the search in the data. Therefore, they are well suited to describe objects in data with noise or artifacts. Ideally, the data component of the active contour prevails in parts of the curve where the data quality is good, while the model component prevails where the data are distorted or missing. A main application of active contours is to extract geometric objects in data with a low signal to noise ratio or in regions of missing signal.

Active contours are effective in dealing with the ambiguities arising in deciding when a fault line should be extracted from a fault-highlighted volume, because of their capability to attach themselves to the geometric structure in the data that they model. In 3D, the application of deformable models or active surfaces will enable the exploitation of geometric continuity constraints between fault lines. This could lead to a further optimization of the fault tracking procedure while retaining the ability for user intervention in cases where superior knowledge on fault interpretation is available. The optimal location of a fault can be searched in a neighborhood of an initial guess at the solution.

Published references on active contours (2D) and deformable models/active surfaces (3D) include:
1) M. Kass, A. Witkin, and D. Terzopolous, "Snakes: Active contour models," *International Journal of Computer Vision* 1, 321-331 (1987).
2) T. McInerney and D. Terzopoulos, "Deformable models in medical image analysis: a survey," *Medical Image Analysis* 1, 91-108 (1996).
3) C. Xu and J. Prince, "Snakes, shapes, and gradient vector flow," *IEEE Trans. Imag. Proc.* 7, 359-369 (1998).
4) J. Montagnat, H. Delingette, and N. Ayache, "A review of deformable surfaces: topology, geometry and deformation," *Image and Vision Computing* 19, 1023-1040 (2001).
5) J. Malik, S. Belongie, T. Leung, and J. Shi, "Contour and texture analysis for image segmentation," *International Journal of Computer Vision* 43, 7-27 (2001).

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:
1. A computer-implemented method for automatically tracking faults in a 2-D imaged seismic cross-section or a 3D imaged seismic data volume, comprising:
  (a) decomposing, with a computer, the imaged seismic data into slopes, wherein the imaged seismic data has previously undergone depth migration; and
  (b) forming, with a computer, a fault-highlighted data volume or cross-section from voxels corresponding to fault discontinuities in the imaged seismic data having slopes that span a broader range of slopes than other voxels in the imaged seismic data;

(c) selecting, with a computer, one or more initial seeds for fault surfaces or fault lines within the fault-highlighted data volume or cross-section;

(d) generating, with a computer, one or more fault contours in the fault-highlighted data volume or cross-section starting from the initial seeds;

(e) displaying, with a computer, a connected, smooth fault surface or line based on the one or more fault contours and (f) exploring for hydrocarbons based at least in part upon the generated fault contours and/or the displayed smooth fault surface or line.

2. The method of claim 1, wherein the generating of fault contours is performed by an active contouring method.

3. The method of claim 1, wherein the initial seeds are selected and input by a user.

4. The method of claim 1, wherein the decomposing of the imaged seismic data is performed using one of curvelets, a local radon decomposition, and wave atoms.

5. The method of claim 1, wherein the decomposing of the imaged seismic data is performed using a cascade of 1D Gaussian filters modulated by complex exponentials.

6. The method of claim 5, wherein the decomposing of the imaged seismic data comprises:

using a cascade of filtering operations to decompose the imaged seismic data into components in a frequency-wavenumber domain wherein the imaged seismic data are represented in terms of tiled windows.

7. The method of claim 6, wherein the cascade of filtering operations is a series of 1D Gaussian filters modulated by complex exponentials, creating a series of Gaussian windows in the frequency-wavenumber domain.

8. The method of claim 7, wherein the series of modulated 1D Gaussian filters are designed to create a series of Fourier-domain windows that when combined captures a selected frequency range and slowness range of frequency and wavenumber space.

9. The method of claim 8, wherein the windows are spaced equally in frequency and slowness within said selected frequency range and slowness range.

10. The method of claim 7, wherein the imaged seismic data are expressed in terms of depth rather than time, and the using of a cascade of 1D modulated Gaussian filters creates a decomposition that when combined captures a selected wavenumber range of $k_x$-$k_y$-$k_z$ space.

11. The method of claim 6, wherein the tiled windows are Gaussian slowness-period packets g that may be expressed mathematically as $$g_{f_0 k_0}(t, x) = \frac{2\pi h_f h_k}{\ln 2} \text{Re}\left(\left(e^{i 2\pi f_0 t} e^{-\frac{\pi^2 t^2 h_f^2}{\ln 2}}\right) * \left(e^{i 2\pi k_0 x} e^{-\frac{\pi^2 x^2 h_k^2}{\ln 2}}\right)\right)$$

where $h_k$ and $h_f$ are the Gaussian's half width at half maximum along wavenumber k and frequency f respectively, and $f_0$ and $k_0$ are central frequencies and wavenumbers of the packets distributed evenly in central slowness $p_0 = k_0/f_0$ and central frequency.

12. The method of claim 11, wherein said normalization factors computed to produce a flat impulse response may be expressed mathematically as $$W_f = \sum_{m=-(n_f-1)/2}^{(n_f-1)/2} 2 e^{-\frac{\pi^2 h_t^2}{\ln 2}\left(\frac{f_{max} - f_{min}}{2} - m \frac{\sqrt{2} \ln 2}{\pi h_t}\right)^2}$$

and $$W_p(f) = \sum_{l=-(n_p-1)/2}^{(n_p-1)/2} 2 e^{-2\frac{(2\pi h_x l \Delta p f)^2}{\ln 2}}$$

where $n_f$ Gaussian windows are applied across the time axis in time-space domain with a half-width in time of $h_t$, and $n_p$ Gaussian windows are applied across the spatial axis with a half-width of $h_x$ and slowness interval of $\Delta p$.

* * * * *